(12) United States Patent
Miller (10) Patent No.: US 7,148,703 B2
(45) Date of Patent: *Dec. 12, 2006

(54) AUTO-DEEP SCAN FOR CAPACITIVE SENSING

(75) Inventor: Lawrence F. Miller, Los Gatos, CA (US)

(73) Assignee: Zircon Corporation, Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/846,337

(22) Filed: May 14, 2004

(65) Prior Publication Data

US 2005/0253597 A1    Nov. 17, 2005

(51) Int. Cl.
  *G01R 27/26* (2006.01)
  *G01R 19/00* (2006.01)
(52) U.S. Cl. .................. 324/662; 324/686; 324/67
(58) Field of Classification Search ............. 324/686, 324/662, 67, 663, 665
  See application file for complete search history.

(56) References Cited

U.S. PATENT DOCUMENTS

| | | | |
|---|---|---|---|
| 3,278,843 A | 10/1966 | Deming | |
| 3,662,258 A | 5/1972 | Murphy et al. | |
| 3,704,413 A | 11/1972 | Blevins | |
| 3,836,848 A | 9/1974 | Blevins | |
| 3,893,025 A | 7/1975 | Humphreys, Jr. | |
| 4,041,382 A | 8/1977 | Washburn | |
| 4,067,225 A | 1/1978 | Dorman et al. | |
| 4,086,528 A | 4/1978 | Walton | |
| 4,099,118 A | 7/1978 | Franklin et al. | |
| 4,130,796 A | 12/1978 | Shum | |
| 4,322,678 A | 3/1982 | Capots et al. | |
| 4,464,622 A | 8/1984 | Franklin | |
| 4,639,666 A | 1/1987 | Strosser et al. | |
| 4,676,100 A | 6/1987 | Eichberger | |
| 4,752,727 A | 6/1988 | Schneider | |
| 4,847,552 A | 7/1989 | Howard | |
| 4,853,617 A | 8/1989 | Douglas et al. | |

(Continued)

FOREIGN PATENT DOCUMENTS

EP    1 341 005 A2    9/2003

(Continued)

OTHER PUBLICATIONS

International Search Report mailed on May 30, 2005 for PCT patent application No. PCT/US2005/003348 filed Feb. 4, 2005, 3 pages.

(Continued)

*Primary Examiner*—Andrew H. Hirshfeld
*Assistant Examiner*—John Zhu
(74) *Attorney, Agent, or Firm*—Morrison & Foerster LLP (57) ABSTRACT

A stud or joist sensor and associated sensing method using an amplitude and a ratio of capacitance measurements from a plurality of capacitive sensing elements. The sensor locates a feature of an object or discontinuity behind a surface or wall, such as an edge and/or a center of a stud behind the surface, a joist under a floorboard, a gap behind sheetrock, a metal conductor behind a surface or the like. The sensor may be moved over the surface, thereby detecting changes in capacitance. The change in capacitance is due to the effective dielectric constant caused by the passage over a hidden object such as a stud. When two capacitive sensing elements provide equivalent capacitance measures, the sensor is over a centerline of the stud. When a ratio of the capacitance measurements equals a transition ratio, the sensor is over an edge of the stud. When the sensor is over the stud and the capacitance measurements are low, the sensor is over a deep stud.

14 Claims, 7 Drawing Sheets

U.S. PATENT DOCUMENTS

| | | | |
|---|---|---|---|
| 4,868,910 A | 9/1989 | Maulding | |
| 4,939,455 A | 7/1990 | Tsugawa | |
| 4,947,116 A | 8/1990 | Welcome et al. | |
| 4,992,741 A | 2/1991 | Douglas et al. | |
| 5,023,494 A | 6/1991 | Tsukii et al. | |
| 5,283,528 A | 2/1994 | van Seeters | |
| 5,352,974 A | 10/1994 | Heger | |
| 5,425,367 A * | 6/1995 | Shapiro et al. | 600/424 |
| 5,457,394 A | 10/1995 | McEwan | |
| 5,485,092 A | 1/1996 | Fortin | |
| 5,594,353 A | 1/1997 | Hemphill | |
| 5,617,031 A | 4/1997 | Tuttle | |
| 5,619,128 A | 4/1997 | Heger | |
| 5,812,057 A | 9/1998 | Hepworth et al. | |
| 5,917,314 A | 6/1999 | Heger et al. | |
| 6,023,159 A | 2/2000 | Heger | |
| 6,198,271 B1 * | 3/2001 | Heger et al. | 324/67 |
| 6,211,662 B1 | 4/2001 | Bijawat et al. | |
| 6,501,284 B1 * | 12/2002 | Gozzini | 324/662 |
| 6,552,677 B1 * | 4/2003 | Barnes et al. | 342/22 |
| 6,556,935 B1 | 4/2003 | Morimura et al. | |
| 6,587,093 B1 * | 7/2003 | Shaw et al. | 345/163 |
| 6,650,126 B1 | 11/2003 | Indihar | |
| 6,700,391 B1 * | 3/2004 | Strack et al. | 324/662 |
| 6,804,262 B1 * | 10/2004 | Vogel et al. | 370/480 |
| 6,894,508 B1 * | 5/2005 | Sanoner et al. | 324/662 |

FOREIGN PATENT DOCUMENTS

EP  1 341 005 A3  9/2003

OTHER PUBLICATIONS

International Search Report mailed on Jun. 8, 2005 for PCT patent application No. PCT/US2005/004586 filed on Feb. 11, 2005, 3 pages.

Wang, B. et al. (May 19-21, 1997). "High-Accuracy Circuits for On-Chip Capacitive Ratio Testing and Sensor Readout," *IEEE Instrumentation and Measurement Technology Conference, Ottawa, Canada* (May 19-21, 1997), 2:1169-1172.

* cited by examiner

AUTO-DEEP SCAN FOR CAPACITIVE SENSING

BACKGROUND OF THE INVENTION

1. Field of the Invention

This invention relates to an electronic sensor, and, in particular, to a sensor suitable for detecting the location of an object behind a variety of surfaces, such as walls, floors and other non-electrically conductive structures (but not limited to building structures). More specifically, the invention relates to an electronic sensor useful to detect centerlines and edges of wall studs, floor joists, and the like.

2. Description of the Prior Art

U.S. Pat. No. 4,464,622 entitled "Electronic wall stud sensor," issued Aug. 7, 1984, and incorporated in its entirety by reference herein, discloses an electronic wall stud sensor particularly suitable for locating a stud positioned behind a wall surface. (A "stud" is a structural member of a building to which an interior wall surface such as wall board or paneling is affixed.) Typically in the U.S., "2-by-4" wooden studs are used in construction. Nominally, a 2-by-4 stud is 51 mm (2 inches) wide and 102 mm (4 inches) deep and of any suitable length. The actual dimensions of a 2-by-4 are more typically 38 mm (1½ inches) wide and 89 mm (3½ inches) deep. Use of English (inches) units and U.S. stud sizes here is in conformance with U.S. construction practice and is not intended to be limiting, but is only illustrative. Finding studs is a typical problem for building repairs, picture hanging, etc.

The sensor detects the stud by measuring a change in capacitance due to a change in the dielectric constant along the wall. Due to the placement of the studs, a wall surface exhibits changing dielectric constants while the sensor is moved along the wall surface. The sensor includes a plurality of capacitor plates, a circuit for detecting changes in the capacitance, and an indicator.

The plurality of capacitor plates is mounted in the sensor such that they can be positioned close to a wall's surface. When the capacitor plates are drawn along the surface, the circuit detects a change in the capacitance of the plates due to a change in the average dielectric constant of the surface. The capacitor plates are used to measure the effective capacitance or change in capacitance of a wall. Before detection begins, the sensor first performs a calibration to null out the effect of a wall in the absence of a stud.

The capacitor plates are composed of a center plate and a symmetric pair of electrically connected edge plates. A difference in capacitance between the center and edge plates is used to determine the location of the edge of a stud. The centerline of the stud is then determined by finding both the left and right edges of the stud and then measuring to the middle of the distance between the edges. Thus, multiple measurements must be made in order to determine the centerline of the stud. The indicator indicates a change in capacitance of the capacitor plate, thereby alerting an operator to the wall stud position. The indicator also alerts the operator when calibration is occurring.

While this procedure is effective in determining the centerline of a stud, significant errors in determining the location of the stud's edges can occur. One factor is the depth of the stud behind the surface. Due to the thickness of the sheetrock (also referred to as gypsum wall board and which has a thickness of 16 mm or equivalently ⅝ of an inch) or other wall surface material, a "ballooning" effect may distort the perceived width of the stud. The closer a stud is positioned to the surface, the wider the stud will appear when sensed in this way. Similarly, the farther or deeper a stud is positioned, the narrower the stud will appear. This ballooning effect is exacerbated when the sensitivity of the sensor is increased to aid in detecting deeper studs. The ballooning may be asymmetric due to electrical wires, metallic pipes and other objects in close proximity to the stud, which in turn may lead to a reduced ability to accurately determine a stud's centerline. In the case of extreme ballooning, location of an edge of a stud can be inaccurately indicated by as much as 51 mm (2 inches). Similarly, the centerline of the stud may be so inaccurately indicated that it is completely off the actual stud location.

A first method of compensating for the ballooning effect is shown in U.S. Pat. No. 6,023,159, entitled "Stud sensor with dual sensitivity," issued Feb. 8, 2000, and incorporated by reference herein in its entirety. Unfortunately, using a dual sensitivity control only partially minimizes the ballooning effect.

A second method of compensating for the ballooning effect is shown in U.S. Pat. No. 5,917,314, entitled "Electronic wall-stud sensor with three capacitive elements," issued Jun. 29, 1999, and incorporated by reference herein. This second method discloses using three parallel sensing plates and using sums and differences between the various plate capacitances to determine the centerline and edges of a stud.

The above methods, which use electronic wall stud sensors, are unable to reliably and accurately sense an edge of a stud (or other structural member) through surfaces that are thicker than 38 mm (1½ inches). Additionally, these sensors, if overly sensitive, falsely indicate the presence of non-existing studs. Therefore, known sensors have disadvantages.

BRIEF SUMMARY

An apparatus and method for determining a feature of a member located behind a surface while reducing effects of an unknown thickness of the member are provided. The feature is, e.g., a centerline and/or an edge of a building object or member, such as a stud or joist but is not so limited. The feature may also be an edge of a gap or discontinuity of the structure. The sensor apparatus includes a plurality of capacitive plates. The sensor may also include circuitry to sense an effective capacitance created by a plate, the covering and objects behind the covering. The sensor may compute a ratio between the capacitance measurements of a pair of the plates. A ratio of approximately one may indicate a centerline of a stud or joist or similar member. A ratio in a predetermined range may indicate an edge of a stud or joist. Additionally, the sensor may analyze a capacitance measurement to determine a depth of the feature.

Some embodiments of the invention provide a method of finding a feature behind a surface using a sensor having first and second plates, the method comprising the acts of: moving the sensor and surface adjacent one another; measuring a first capacitance of a first capacitor including the first plate and the feature; measuring a second capacitance of a second capacitor including the second plate and the feature; computing a ratio of the first and second capacitance measurements; and comparing one of the first or second capacitance measurements with a first threshold, thereby to determine an indication of a depth of the feature.

Some embodiments of the invention provide a method of finding a feature behind a surface using a sensor having a first plate and a second plate of approximately equal areas, the method comprising the acts of: moving the sensor and surface adjacent one another; measuring a first capacitance of a first capacitor including the first plate and the feature; measuring a second capacitance of a second capacitor including the second plate and the feature; comparing the first capacitance measurement to the second capacitance measurement; comparing one of the first or second capacitance measurements with a first threshold; and repeating the acts of measuring and comparing.

Some embodiments of the invention provide a sensor for finding a feature of a structure comprising: a first plate having a first capacitance and adapted for forming a first capacitor with the structure; a second plate having a second capacitance and adapted for forming a second capacitor with the structure; a first measurement circuit coupled to the first plate, the first measurement circuit measuring a first capacitance value of the first capacitor; a second measurement circuit coupled to the second plate, the second measurement circuit measuring a second capacitance value of the second capacitor; and a comparison circuit coupled to the first and second measurement circuits, the comparison circuit generating a ratio of the first and second capacitance values and comparing one of the first or second capacitance values to a first threshold.

Some embodiments of the invention provide a sensor comprising: a first plate and a second plate positioned in about the same plane and spaced apart, and adapted to be located adjacent a surface; a measurement circuit coupled to the first and second plates thereby to measure a capacitance value of each of the plates; a first comparison circuit coupled to receive the measured capacitance values and determine a ratio between a change in the measured capacitance values; and a second comparison circuit coupled to receive one of the measured capacitance values and a threshold and to provide a comparison therebetween.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

This application relates to U.S. patent application Ser. No. 10/794,356 filed Mar. 4, 2004, titled "RATIOMETRIC STUD SENSING" and which is incorporated herein in its entirety by reference.

A ratiometric capacitive sensor may use capacitance measurements from multiple conductive plates to determine the presence of objects, such as studs and joists, hidden behind a covering surface such as a wall, floor, ceiling, etc. In some embodiments, a ratiometric capacitive sensor includes two conductive plates. Each conductive plate acts as part of a separate capacitor. Circuitry coupled to each plate measures an effective change in capacity of the separate capacitors, which is effected by the density of material in close proximity to the plates. As a result, a wall or other surface covering combined with an underlying stud or other member form a larger capacitance than a wall covering alone without a stud. A capacitance measurement may be taken from each plate. The capacitance measurement from one plate may then be compared to a capacitance measurement of another plate to determine boundaries and features of the materials in the vicinity of the plates.

Figure 1A:
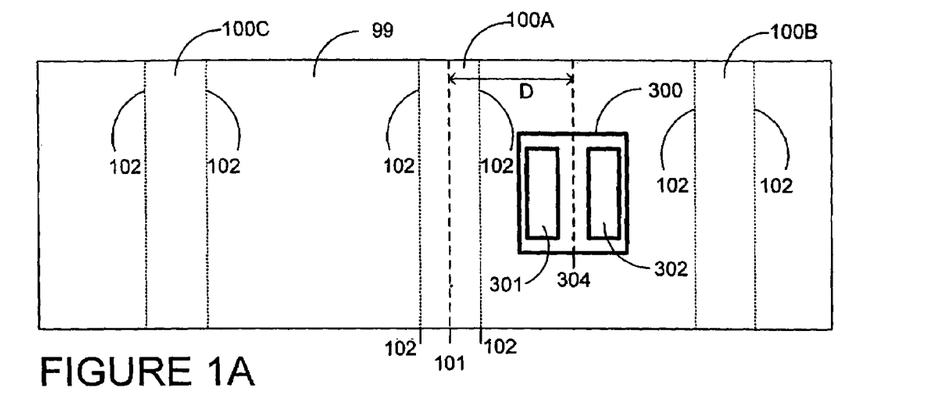
FIGS. 1A–1D illustrate a plan view of and capacitance produced by a ratiometric capacitive sensor having two primary plates, in accordance with the present invention, positioned at a lateral distance away from an object, such as a hidden stud.

FIG. 1A illustrates a plan view of a capacitive sensor 300 having two primary plates 301, 302, in accordance with the present invention. The sensor 300 is positioned against a wall 99 at a lateral distance D away from a hidden stud 100A. A wall may have multiple studs 100 (e.g., 100A, 100B and 100C). Each stud 100 has two edges 102 and defines a centerline 101 relative to its positioning along the wall 99. Additionally, sensor 300 defines a centerline 304 that may be equally positioned between a first plate 301 and a second plate 302. In some embodiments, associated circuitry and/or software (not shown) operates to independently measure values indicative of a capacitance of each plate 301 and 302.

Figure 1B:
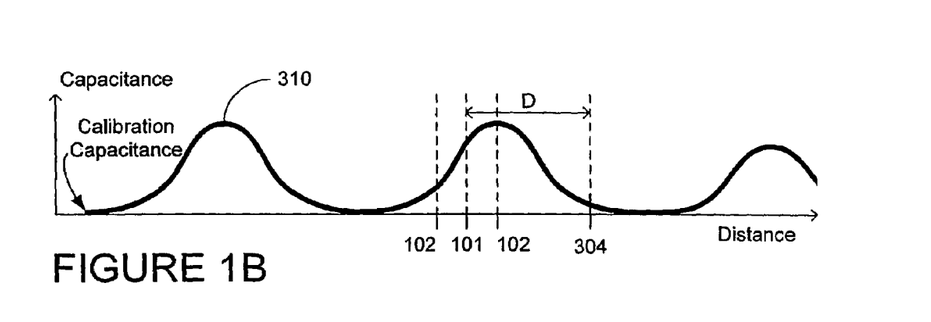
Figure 1C:
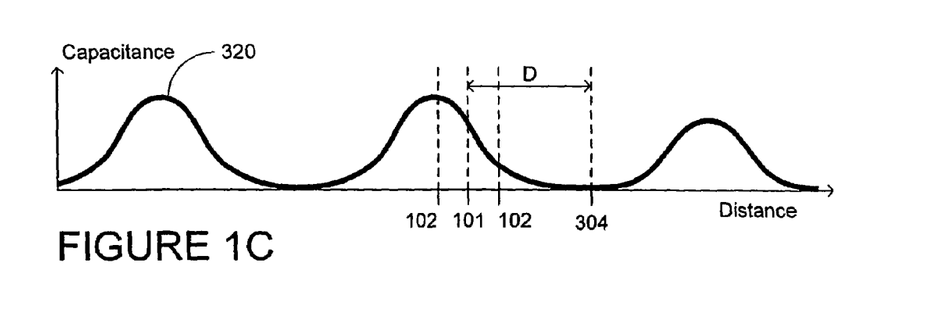

FIGS. 1B and 1C illustrate a capacitance produced between each respective plate 301 and 302 of the sensor 300 and the wall 99. FIG. 1B shows a capacitance curve 310 produced by the first plate 301 and the wall 99. FIG. 1C shows a capacitance curve 320 produced by the second plate 302 and the wall 99. Capacitance curves 310 and 320 are drawn relative to the centerline 304 of the sensor 300. Additionally, curves 310 and 320 show peaks when respective plates 301 and 302 are positioned over the centerline 101 of a stud 100 and show valleys when respective plates 301 and 302 are positioned between pairs of studs 100.

At points where a sensor 300 measures a minimum capacitance valve or a relatively low capacitance valve, sensor 300 may be positioned far from any stud 100. The measured capacitance values increase as the sensor 300 nears the stud 100; however, the capacitance values of each plate 301 and 302 will differ if one of the plates is closer to the stud 100. For example, a first plate 301 may be close to or over an edge 102 of a stud 100. At the same time, the second plate 302 may still be positioned at a lateral distance away from the stud 100. In this case, the change in capacitance from its minimum value experienced by the first plate 301 will be greater than the change in capacitance experienced by the second plate 302.

In some embodiments, the capacitance measurements are used to calculate a ratio. A first capacitance measurement represents the change in capacitance from a calibration value experienced on a first plate 301. A second capacitance measurement represents the change in capacitance from a calibration value experienced on a second plate 302. A ratio between the first and second capacitance measurements may be computed. If the ratio is approximately equal to a determined value, it may be realized that a centerline 304 of the sensor 300 is centered over an edge 102 of a stud 100. If the capacitance measurements are equal or the ratio is approximately equal to unity, both plates may be centered over the stud's edge 102 and the centerline 304 of the sensor 300 may be centered over the centerline 101 of the stud 100.

Figure 1D:
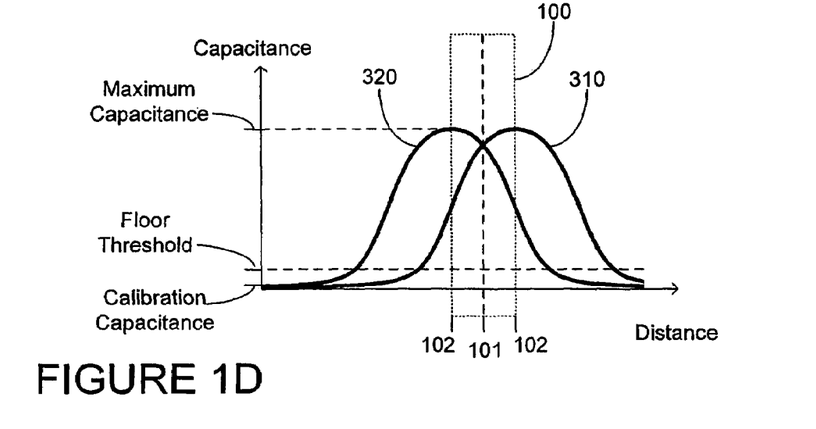

FIG. 1D shows overlapping first and second capacitance curves 310 and 320 relative to the centerline 304 of the sensor 300 and a stud 100. A point at which curves 310 and 320 intersect may indicate a position of the sensor 300 where each plate is encountering an equal capacitance; therefore, the centerline 304 of the sensor 300 may be directly over a centerline 101 of the stud 100. In some embodiments, at least one of the capacitance values must be above a floor threshold value, a value above a calibration capacitance value, before the capacitance measurements are compared with each other.

Figure 1E:
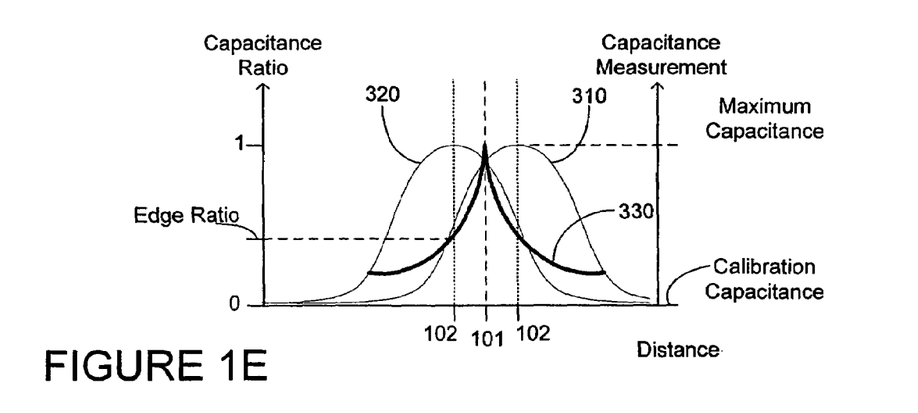

FIG. 1E shows a graph of a curve 330, which represents a ratio of capacitance measurements of two primary plates 301, 302 versus a lateral distance between a ratiometric capacitive sensor's centerline 304 and a centerline 101 of a stud 100, in accordance with the present invention. This ratio may be computed as the smaller capacitance divided by the larger capacitance, thereby resulting in a ratio that is equal to or less than one.

The calculated results, shown in a ratio curve 330, exhibits a sharp peak. The sharp peak of curve 330 allows a ratiometric sensor to locate a stud's centerline 101 with increased accuracy over non-ratiometric sensor, which may generate rounded peaked curves.

Additionally, a transition ratio may be compared to the calculated ratio to determine the location of an edge 102 of a stud 100 as further described below. The transition ratio predicts a capacitance ratio formed at an edge of a stud when the sensor 300 is centered over the stud's edge for a particular wall structure. As such, a transition ratio may be used to indicate when the sensor 300 is centered over an edge 102.

A transition ratio may be determined in a number of ways. The transition ratio may be a factory set constant. Alternatively, the transition ratio may be set by an operator. In some embodiments, the transition ratio is calculated during operation.

In some embodiments, a transition ratio may be set during manufacturing as a factory set constant. For example, a factory may set a transition ratio equal to a fixed value, e.g., 0.33. When plates produce capacitance measurements that form a ratio approximately equal to 0.33, sensor 300 may indicate that the center of sensor 300 is directly over an edge 102 of stud 100.

In some embodiments, a transition ratio may be directly or indirectly selected by an operator of the sensor. For example, an operator may select a stud width and/or a wall thickness. The stud width and/or wall thickness may be used to select an appropriate transition ratio, for example, as shown in the table below.

| Stud Type | Wall Covering Thickness | Transition Ratio |
| --- | --- | --- |
| Double stud 76 mm (3 inches) | Single sheet 13 mm (½ an inch) | 0.32 |
| Single stud 38 mm (1½ inches) | Single sheet 13 mm (½ an inch) | 0.33 |
| Double stud 76 mm (3 inches) | Double sheet 25 mm (1 inch) | 0.35 |
| Single stud 38 mm (1½ inches) | Double sheet 25 mm (1 inch) | 0.45 |

Figure 3:
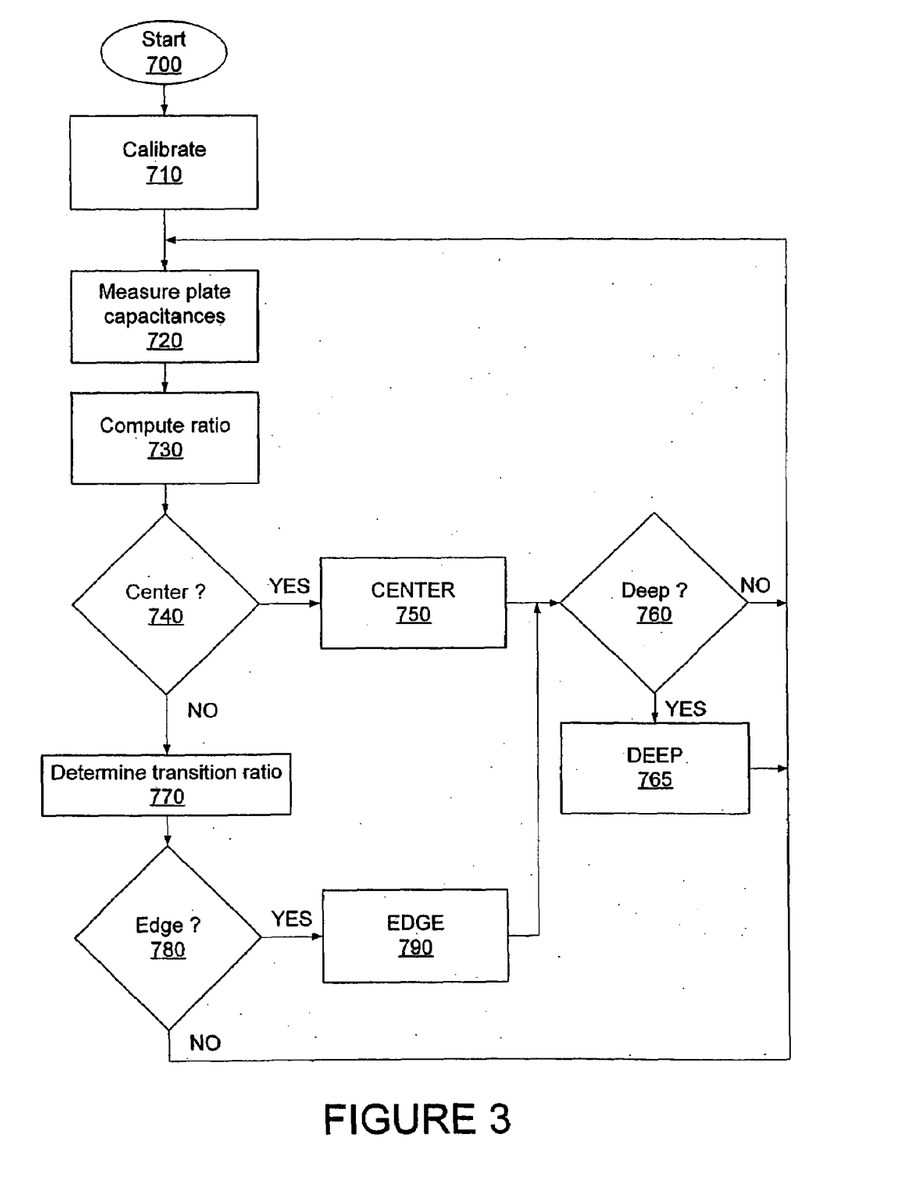
FIG. 3 illustrates a process to indicate whether or not a depth feature of an object, such as a stud, has been detected, in accordance with the present invention.

In some embodiments, a transition ratio may be automatically determined by the sensor 300 based on capacitance measurements. A capacitance measurement may be a measure of a maximum capacitance measurement on a plate as shown in FIG. 3.

In some circumstances, the actual ratio of measured plate capacitances at the stud's edge 102 varies predictably with the wall thickness. Therefore, a maximum measured capacitance value may be used to set a transition ratio used to locate a stud's edge. This maximum value may indicate a wall covering's thickness, with thicker walls having smaller maximum values. The maximum value may also provide an indication of the width of the stud, with wider studs having larger maximum values. The measured capacitance values may also be compared to indicate a direction of a stud with the plate having a higher capacitance measurement indicating the direction of the center of the stud.

In some embodiments, plate capacitance is measured by determining a time it takes to charge a plate 301 or 302 to a determined value. In other embodiments, plate capacitance is measured by determining a voltage that charges a plate 301 or 302 within a determined time. In either case, an output of a digital-to-analog converter ("DAC") may provide a voltage used to charge the plate. A DAC output may be represented by a digital input value. An input to the DAC may be supplied from a counter, such as an up/down counter, or may be supplied from a microcontroller or microprocessor. This input value may be referred to as a DAC count. A DAC count may have a determined reference point. For example, a DAC value may be referenced from zero. Alternatively, a DAC value may be referenced from a value determined from calibration processing or the like.

Figure 2A:
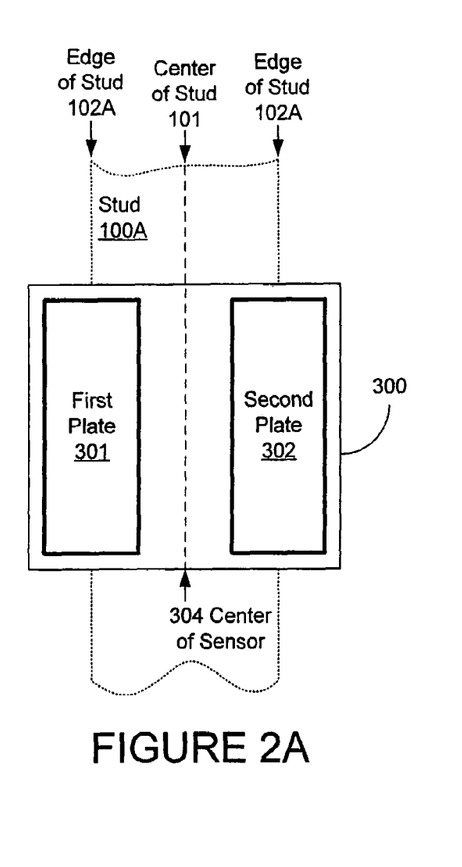
FIGS. 2A–2C show a sensor centered over studs and a graph of capacitance measurements of two primary plates versus a lateral distance between a sensor and a shallow object and a deep object, such as hidden studs, in accordance with the present invention.
Figure 2B:
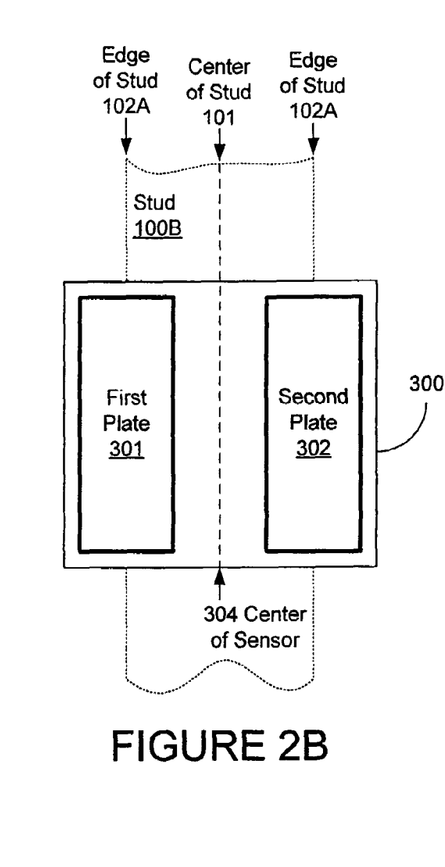

FIGS. 2A and 2B each illustrate a plan view of capacitive sensor 300 with the centerline 304 centered directly over a centerline 101 of a hidden stud 100, resulting in a center-to-center distance of D=0. In this position, each plate 301 and 302 may be partially over the stud 100. Each plate 301 and 302 will have a capacitance value that is some minimum threshold above its calibration value, below its maximum value, and approximately equal to a common value. Therefore, a centerline of an object may be located by identifying when two plates have capacitance values equal to a common value that is above some floor threshold value.

A covering of wall (surface) 99 may be of different thicknesses. A thin wall covering will exhibit a low nominal capacitance, where as a thicker wall covering will exhibit a higher nominal capacitance. A stud positioned behind a thin wall covering will produce a high maximum capacitance. A stud position behind a thicker wall covering will be farther away from the wall's external surface and therefore will produce a lower maximum capacitance.

Figure 2C:
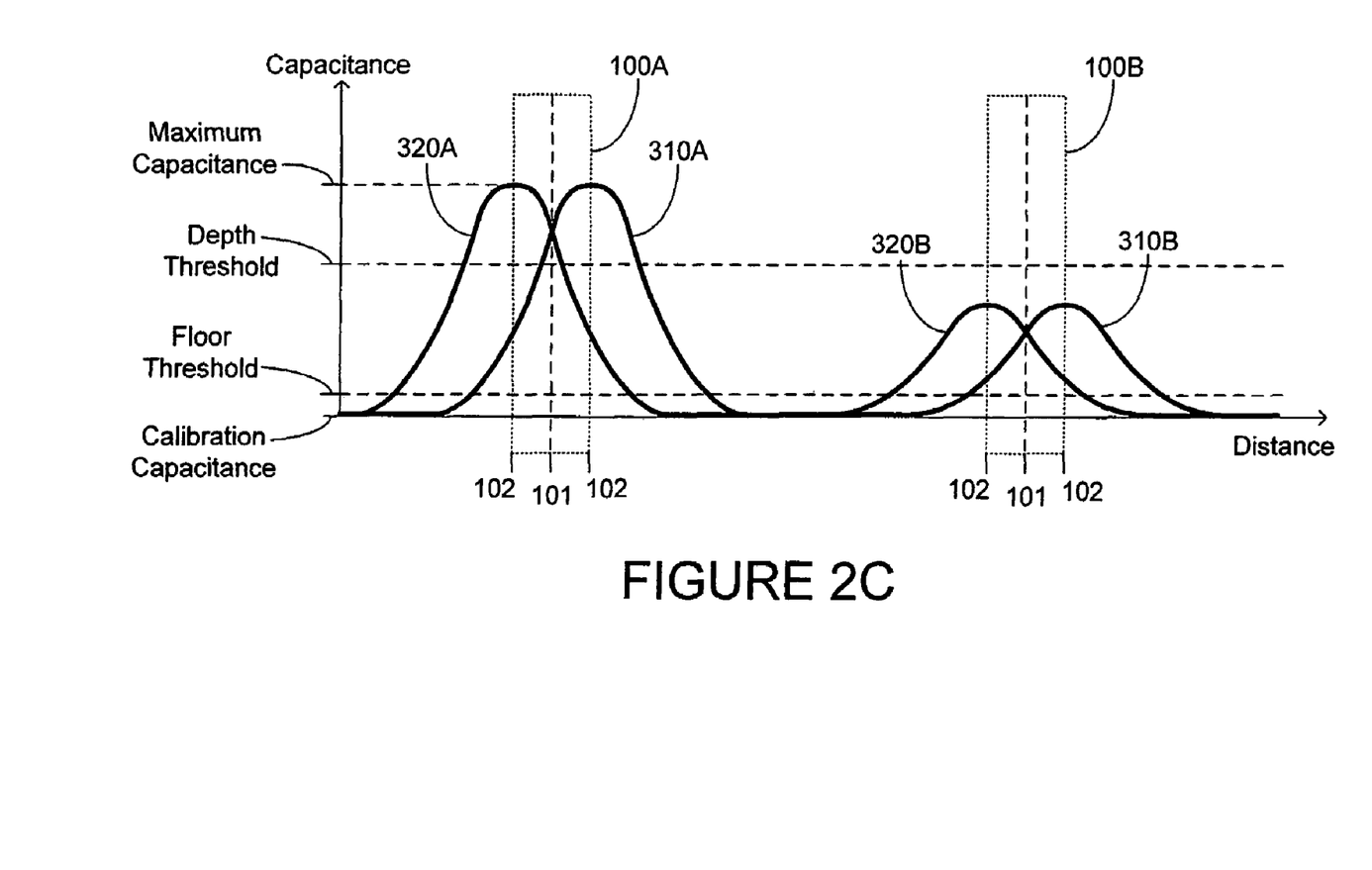

FIG. 2C shows capacitance curves for two plates 301, 302 for a sensor 300 that has been pulled across a wall 99. As a sensor 300 passes over a first stud 100A, sensor 300 measures capacitances shown on curves 310A and 320A for respective plates 301 and 302. As a sensor 300 passes over a second stud 100B, sensor 300 measures lower capacitance values as shown in curves 310B and 320B. Lower capacitance values may represent a deeper (farther behind wall 99) or narrower stud. Alternatively, higher capacitance values may represent a shallower or wider stud.

Sensor 300 may compare capacitance measurements to a depth threshold. For example, when sensor 300 is positioned over an edge of a stud, a center of a stud, or between edges of a stud, sensor 300 may indicate whether or not the detected stud is a deep stud or not a deep stud. The indication may be an audio indication, such as from a buzzer in sensor 300, a visual indication, such as from an LED, a signal level, such as supplied to a control line, or any combination thereof.

The indication of a depth of a feature may be used by the sensor operator. For example, if most features are determined to originate from a non-deep stud, the operator may conclude that deep features are anomalies. Similarly, if most features are determined to be deep, then any non-deep features may be ignored by the operator.

Assuming stud 100A is positioned at a first distance behind a wall's surface and stud 100B is positioned at a farther distance behind the wall's surface, each stud will produce a different capacitance measurement when sensor 300 is centered over the stud. For example, when sensor 300 is centered over stud 100A, DAC counts of 80 above calibration values on each plate may result. When sensor 300 is centered over stud 100B, DAC counts of 30 above the calibration values on each plate may result.

Plates producing equal measurements above a floor threshold indicate that the sensor is centered over the stud. Additionally, a higher DAC count indicates that the stud is closer to the surface, the stud is wider than a reference stud and surface, or a material of higher conductivity is detected. An example DAC count of 80 may represent that a single-width stud is positioned behind a single-layer of sheetrock. An example DAC count of 30 may represent that a single-width stud is positioned behind a double-layer of sheetrock.

In some embodiments, a transition ratio may be calculated by sensor 300 based on a historic maximum capacitance measurement. In other embodiments, the transition ratio may be calculated based on an instantaneous maximum capacitance measurement.

A historic maximum capacitance measurement may be determined over time as measured from either plate 301 or 302. A maximum capacitance measurement is expected when the plate 301 or 302 is centered over a stud. The maximum capacitance measurement may be saved in memory of sensor 300. As the capacitance changes over time, an updated maximum capacitance value may be stored.

Alternatively, a capacitance measurement may be used. A capacitance measurement may be selected each time the sensor 300 takes each pair of capacitance measurements from plates 301 and 302. In some embodiments, the larger of the two capacitance measurements may represent the capacitance measurement. That is:

C=max{FirstPlateValue,SecondPlateValue}.

In other embodiments, the instantaneous capacitance value may be determined by examining the capacitance formed by a single plate 301. In some embodiments, the instantaneous capacitance value is determined over a period of time, e.g., by a moving average or the like.

Using the capacitance measurement, the sensor 300 may select a transition ratio from a table or compute a transition ratio from a formula. A sensor 300, having plates centered 38 mm (1½ inches) apart, with each plate 19 mm (¾ of an inch) wide, may use a transition ratio as shown in the table below. For example, a capacitance measurement of 1.4, representing a double-width stud hidden behind a single sheet of sheetrock, may have a transition ratio of 0.32. A lookup table in the memory of sensor 300 may be used to map a capacitance measurement to a transition ratio.

| Capacitance Measurement | Transition Ratio |
| --- | --- |
| 1.4 | 0.32 |
| 1.0 | 0.33 |
| 0.6 | 0.35 |
| 0.4 | 0.45 |

Alternatively, the sensor 300 may compute a transition ratio for each ratio calculation. In some embodiments, a transition ratio may be calculated as:

$$TR(P) = \begin{cases} 0.61 - 0.28\dfrac{C}{P_{1/2}} & \text{if } C < P_{1/2} \\ 0.33 & \text{else} \end{cases}$$

where TR(P) is a Transition Ratio; $P_{1/2}$ is a design constant; and C is a Capacitance Measurement. The design constant $P_{1/2}$ may be set during manufacturing and may represent the expected maximum capacitance measured over a reference wall structure having a single (nominal) stud having a width of 44 mm (1¾ inches) and a wall covering 99 having a thickness of 13 mm (½ of an inch). In some embodiments, the capacitance C parameter may be the historical maximum capacitance. In other embodiments, the capacitance C parameter may be the instantaneous maximum capacitance of two plate measurements as described above. The formula shows that if C is less than the design constant $P_{1/2}$, the formula is used. If C is greater than or equal to the design constant $P_{1/2}$, a fix value of 0.33 is used.

Once determined, the transition ratio may be used to indicate whether the sensor is centered over an edge of a stud. Sensor 300 may measure a first capacitance value on a first plate 301 and a second capacitance value on a second plate 302. A capacitance ratio may be calculated between the first and second capacitance values. This capacitance ratio may be compared to the predicted transition ratio to determine whether the sensor 300 is presently centered over an edge 102 of a stud 100.

For example, sensor 300 measuring a larger capacitance value of 1.4 may indicate the sensor 300 has passed over a double-wide stud having a width of 76 mm (3 inches) hidden behind a single layer of sheetrock having a thickness of 13 mm (½ an inch). The transition ratio for this wall structure may be set to a value of 0.32. When the sensor 300 detects a position where the first and second capacitance measurements are approximately equal to 0.32, the sensor 300 may indicate that the sensor 300 is centered over an edge 102. In some embodiments, the stud's edge location may be determined to an accuracy of approximately 3 mm (⅛ of an inch) over a wall covering thickness range of 13 to 25 mm (½ to 1 inch).

Measured capacitance values indicate a direction in which a stud 100 is located. At a stud's edge 102, one plate may be directly over the centerline 101 of the stud 100, while the other may be off to one side of the stud 100. The plate 301 or 302 positioned over the stud 100 will have a larger capacitance than the other plate 302 or 301 and will pass through a maximum value as the sensor 300 is drawn across the stud 100. A plate 301 or 302 showing a larger capacitance indicates that the centerline 304 of the sensor 300 needs to be moved in the direction of that plate 301 or 302.

A ratio curve 330 may be computed as follows. When the first plate 301 produces a capacitance that is greater than the capacitance produced by the second plate 302, a ratio is calculated by dividing the second plate's change in capacitance value by the larger first plate's change in capacitance value. Similarly, when the first plate 301 produces a capacitance that is less than the capacitance produced by the second plate 302, the ratio is calculated by dividing the smaller first plate's change in capacitance value by the second plate's change in capacitance value. Formulaically, the ratio curve 330 may be computed by:

$$\text{cap\_ratio}(D) = \frac{\min\{FirstPlateValue(D), SecondPlateValue(D)\}}{\max\{FirstPlateValue(D), SecondPlateValue(D)\}}$$

where the plate value may be a change in value from a calibration value such as a nominal or minimal value determined during calibration. Theoretically, a plate value may be an absolute measurement of capacitance rather than a measurement of a change in capacitance. Practically, a plate value or capacitance measurement is a relative measurement from a value that may exclude parasitic capacitances of a sensor's circuitry and a wall covering. In some embodiments, a plate value is an indirect measure of capacitance. For example, the plate value may be a measure of a number of clock cycles necessary to charge a plate 301 or 302 to a reference level.

FIG. 3 illustrates a process to indicate whether or not a depth feature of an object has been detected, in accordance with the present invention as carried out by a computer program executed by a processor resident in the sensor. The order of steps presented may be rearranged by those of ordinary skill in the art and coding such a program is well within the skill of one of ordinary skill in the art in light of this disclosure. Further, the steps of this process may conventionally be undertaken by conventional circuitry or the computer program or by a combination thereof.

At step 700, a sensor 300 powers up and may be positioned against a surface 99. Sensor 300 performs a calibration step 710 to reduce the impact of parasitic circuit and wall capacitances. The calibration step determines a calibration capacitance such as a DAC value that represents an absolute capacitance of a plate over the wall structure and includes parasitic capacitances of the sensor 300.

At step 720, sensor 300 begins a process of measuring plate capacitances, e.g., determining capacitance measurements in the form of a relative capacitance values from the calibration capacitance values. At step 730, the sensor 300 computes a capacitance ratio between plate capacitance measurements from step 720.

At step 740, a sensor 300 determines whether the capacitive measurements of step 720 indicate a centerline 101 of an object or a discontinuity has been detected. That is, if the capacitance ratio is approximately equal to unity, or alternatively, if the capacitance measurements are approximately equal to one another. If not, the process may continue to step 770. If so, at step 750, sensor 300 may provide a visual and/or an audio indication that a centerline 101 of the object or the discontinuity is detected.

At step 760, sensor 300 determines whether the detected center is a deep feature. A deep feature may be determined by comparing one or more of the measured plate capacitances (from step 720) with a threshold value such as depth threshold indicated in FIG. 2C. If a deep feature is not detected, sensor 300 repeats the process with step 720. If a deep feature is detected, at step 765, sensor 300 may provide an indication that a deep feature was detected.

At step 770, sensor 300 determines a transition ratio. At step 780, sensor 300 compares the computed capacitance ratio to the determined transition ratio. That is, sensor 300 determines whether the capacitive measurements of step 720 indicate that an edge of an object or a discontinuity has been detected. An edge is detected when the capacitance ratio is approximately equal to a transition ratio. If not, sensor 300 repeats the process with step 720. If so, at step 790, sensor 300 provides a visual and/or an audio indication that an edge of the object or the discontinuity is detected. A sensor 300 then determines whether the detected edge is a deep feature as described with step 760 above.

Additionally, sensor 300 may determine a relative direction an object or a discontinuity exists based on the relative magnitudes of the measured plate capacitances. For example, the sensor 300 indicates that the stud is positioned to the left of the centerline 304 of the sensor 300. Sensor 300 indicates the direction of an object or a discontinuity audibly and/or visually.

In operation, an operator or user may pass sensor 300 across wall 99. If each stud feature is detected as not being associated with a deep stud except for one stud, the operator may use the deep indication as a warning and conclude the deep feature is an anomaly.

Similarly, if an operator discovers all stud features are associated with deep studs except for one non-deep stud, the operator may conclude that the non-deep stud is an anomaly. For example, a wall may have all wood studs and some metallic wiring. The wood studs, if behind two or three layers of sheetrock, may appear as deep studs. The metal wiring may appear as a shallow stud. The operator may conclude that the indication of a shallow stud was erroneous.

An apparatus in accordance with the present invention may have features implemented in hardware, software or a combination of hardware and software. Thus, blocks described with reference to the following figures may be implemented in hardware, software, firmware, dedicated circuitry, and/or programmable circuitry, or a combination thereof.

Figure 4A:
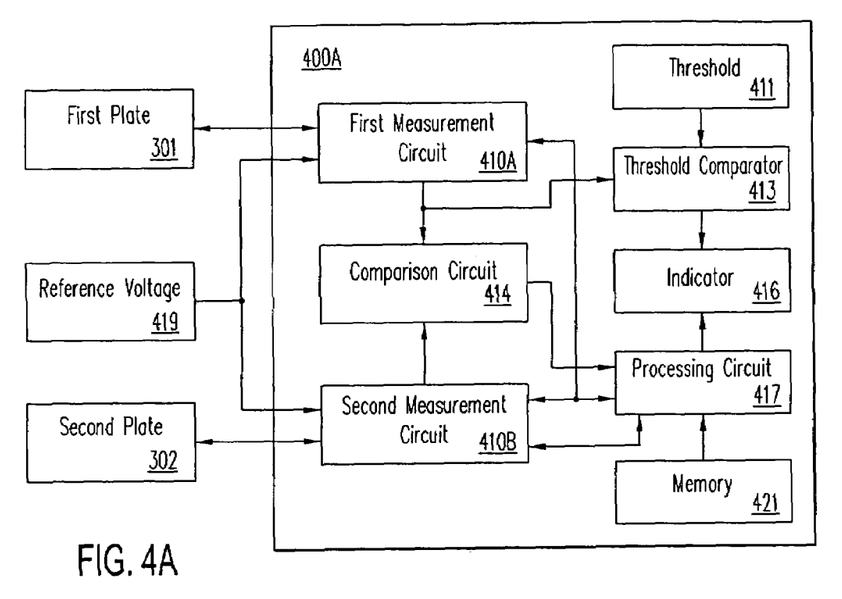
FIGS. 4A and 4B each show a block diagram of a capacitive sensor having two primary plates and circuitry, in accordance with the present invention.

FIG. 4A shows a block diagram of a capacitive sensor having two primary plates 301 and 302 and associated circuitry 400A, in accordance with the present invention. In some embodiments, a sensor includes a first plate 301, a second plate 302 and electronic circuitry 400A having a first measurement circuit 410A, a second measurement circuit 410B, a comparison circuit 414, and an indicator 416. The first and second plates 301 and 302 are conventionally charged and discharged by the respective first and second measurement circuits 410A, 410B.

Each measurement circuit 410A, 410B provides a capacitance measurement to the comparison circuit 414. The capacitance measurement may be an indication of a change in capacitance from a nominal capacitance experienced during calibration. The comparison circuit 414 processes the capacitance measurements. For example, the comparison circuit 414 may compute a ratio between the capacitive measurements. The comparison circuit 414 may determine whether the capacitive measurements are within a predetermined value of each other. The comparison circuit 414 may determine whether one of the capacitive measurements is above or below a threshold, thereby determining a depth feature of an object, e.g., whether the object, such as a stud, is far or near to the surface.

The comparison circuit 414 then provides a signal to the indicator 416. The indicator 416 may be used to alert the operator of information regarding an object, such as a stud. The indicator 416 may identify a detection of, for example, an edge of an object, a center of an object, or that the sensor is over an object, or the sensor is approaching an object. The indicator 416 may provide a direction of increasing capacitance, thereby informing an operator as to which direction to move the sensor. The indicator 416 may also provide an indication of whether the object is near or far/deep from the surface. The comparison circuit 414 (e.g., a comparator) may compare and/or process the capacitance measurements to determine whether an object or a discontinuity is present and/or whether a feature of an object or a discontinuity is detected. For example, comparison circuit 414 may determine that the sensor 300 is centered over a stud 100 by detecting that the capacitance measurements are equal to each other and also above a floor threshold. Capacitance measurements may be considered equal when they are within a predetermined percentage value or absolute value from each other.

Comparison circuit 414 may determine that the sensor is centered over an edge 102 of a stud 100 by detecting that the capacitance measurements form a ratio that is equal to a transition ratio. The transition ratio may be a fixed value, a value indirectly or directly selected by a user, a value extracted from a lookup table or a computed value. A capacitance ratio may be considered equal to the transition ratio when the capacitance ratio falls within range of values about the transition ratio.

In some embodiments, the comparison circuit 414 couples capacitance measurement to the indicator 416. The indicator 416 may visually (or audibly) display a value indicative of each capacitance value. The operator may use the displayed values to visually determine whether an object or a discontinuity exists, for example, by looking for changing capacitive measurements. Additionally, an operator may use the displayed values to visually determine the location of edges 102 and centerlines 101 of studs 100, for example, by looking for capacitance measurements equaling a transition ratio. Also shown in FIG. 4A is threshold circuitry including a source 411 of a threshold voltage coupled to threshold comparator 413 which also is coupled to the output terminals of measurement circuits 410A, 410B and which outputs a signal to indicator 416 to indicate if the feature is deep. Reference voltage source 419 supplies a reference voltage to each of measurement circuits 410A, 410B. Processing circuit 417 receives an input signal from comparison circuit 414 to receive the ratio value from same and also is coupled to memory 421 storing a look-up table having the transition ratio. Processing circuit 417 also supplies an output signal to measurement circuits 410A, 410B, see below regarding FIG. 5.

Figure 4B:
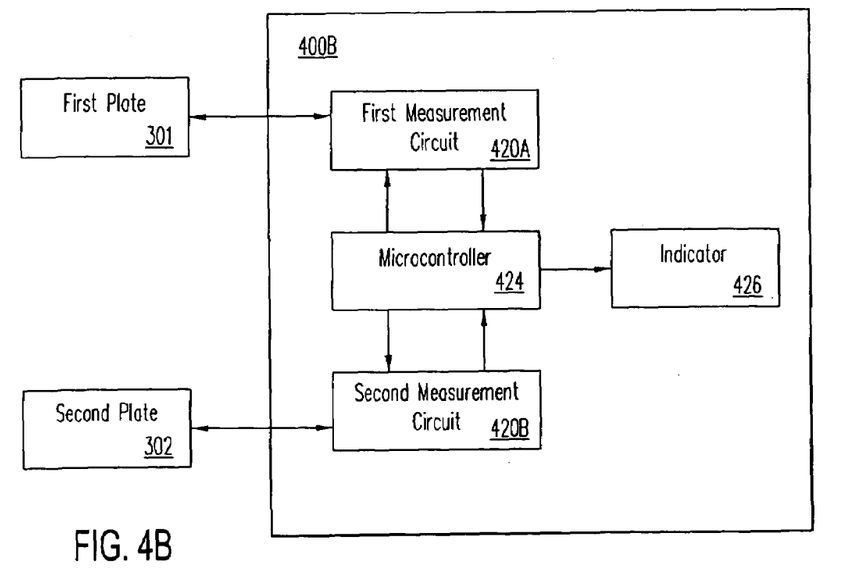

FIG. 4B shows another version of a sensor having two primary plates 301 and 302 and circuitry 400B. The sensor includes a first plate 301, a second plate 302 and electronic circuitry 400B having a first measurement circuit 420A, a second measurement circuit 420B, a properly programmed microcomputer or a microcontroller 424, and an indicator 426. Here microcontroller 424 carries out the comparator functions of comparison circuit 414 of FIG. 4A.

Figure 5:
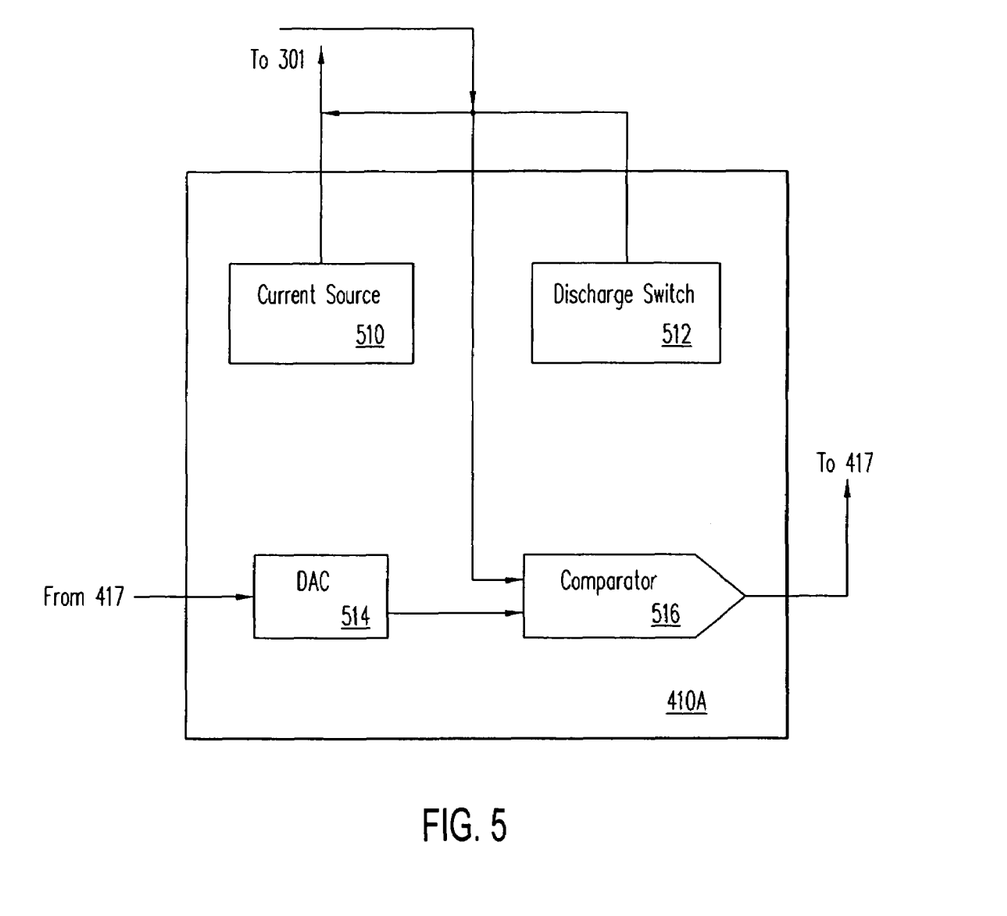
FIG. 5 shows detail of FIG. 4A.

The first and second plates 301 and 302 are charged and discharged by the respective first and second measurement circuits 420A, 420B. Each measurement 402A, 402B circuit provides a capacitance measurement to the microcontroller 424. Additionally, the microcontroller 424 may provide timing or other control signals to the first and second measurement circuits 420A and 420B. The microcontroller 424 processes the capacitance measurements and may provide a signal to the indicator 426. The indicator 416 may include a display, such as a liquid crystal display and/or LEDs, and may include an audio device, such as a speaker or buzzer. FIG. 5 shows detail of measurement circuits 410A, 410B, in this case 410A. It includes a current source 510 coupled to the associated plate 301, and a discharge switch 512 similarly coupled. Also included is a digital-to-analog converter (DAC) having its input terminal coupled to receive a data signal from the processing circuit 417 and an output terminal coupled to an input terminal of a comparator 516. The other input terminal of comparator 516 is coupled to plate 301.

A ratiometric capacitive sensor 300 in accordance with the invention may be used to detect a variety of hidden objects in addition to studs and joists. For example, a sensor having long and narrow plates may be used to find a crack or gap hidden behind a surface. Sensor 300 may be used to find a safe hidden behind a wall. Sensor 300 may be used to find brick wall hidden behind sheetrock. Additionally, sensor 300 may be stationary and be positioned to allow objects with hidden features to pass across its plates.

While the present invention has been described with reference to one or more particular variations, those skilled in the art will recognize that many changes may be made thereto without departing from the spirit and scope of the present invention. Each of these embodiments and obvious variations thereof are contemplated as falling within the scope of the claimed invention, which is set forth in the following claims.

We claim:

1. A sensor for finding a feature of a structure behind a surface comprising:

a first plate having a first capacitance and adapted for forming a first capacitor with the structure;

a second plate having a second capacitance and adapted for forming a second capacitor with the structure;

a first measurement circuit coupled to the first plate, the first measurement circuit measuring a first capacitance value of the first capacitor;

a second measurement circuit coupled to the second plate, the second measurement circuit measuring a second capacitance value of the second capacitor; and a comparison circuit coupled to the first and second measurement circuits, the comparison circuit generating a ratio of the first and second capacitance values to determine a lateral location of the feature relative to the plates and comparing one of the first or second capacitance values to a first threshold to determine a depth of the feature relative to the surface, further comprising threshold circuitry coupled to first and second measurement circuits, the threshold circuitry determining whether the first and second capacitance values are above a second threshold to determine if the feature is deep.

2. The sensor of claim 1, wherein:
the first capacitance value represents a difference between the first capacitance and an initial capacitance of the first capacitor; and
the second capacitance value represents a difference between the second capacitance and an initial capacitance of the second capacitor.

3. The sensor of claim 1, further comprising a processing circuit coupled to the comparison circuit and coupled to receive the ratio value.

4. The sensor of claim 3, wherein the processing circuit determines whether the ratio is within a predetermined range.

5. The sensor of claim 4, further including an indicator coupled to the processing circuit, the indicator providing an indication that the sensor is over an edge of the structure when the ratio is within the predetermined range.

6. The sensor of claim 3, wherein the processing circuit determines whether the capacitance ratio is within a predetermined range of one.

7. The sensor of claim 6, further including an indicator coupled to the processing circuit, the indicator providing an indication that the sensor is over a centerline of a portion of the structure when the ratio is within the range of one.

8. The sensor of claim 5, further including a memory storing look-up table and coupled to the processing circuit, the look-up table having a transition ratio for the processing circuit, wherein the transition ratio is used to set the predetermined range.

9. The sensor of claim 3, further comprising:
a source of a reference voltage;
wherein the first measurement circuit includes a first index, the first index indicating a number of clock cycles needed to charge the first plate to the reference voltage level; and
wherein the second measurement circuit includes a second index, the second index indicating a number of clock cycles needed to charge the second plate to the reference voltage level.

10. The sensor of claim 9, wherein the first and second measurement circuits respectively include:
a current source coupled to a respective one of the first or second plates;
a discharge switch coupled to the respective one of the first or second plates;
a digital-to-analog converter (DAC) having an input terminal coupled to receive a data signal from the processing circuit and an output terminal; and
a comparator having a first input terminal coupled to the respective one of the first or second plates, a second input terminal coupled to the DAC, and an output terminal providing the output signal of the measurement circuit.

11. A sensor comprising:
a first plate and a second plate positioned in about the same plane and spaced apart, and adapted to be located adjacent a surface;
a measurement circuit coupled to the first and second plates thereby to measure a capacitance value of each of the plates;
a first comparison circuit coupled to receive the measured capacitance values and determine a ratio between a change in the measured capacitance values to determine a lateral location of a feature behind the surface relative to the plates; and
a second comparison circuit coupled to receive one of the measured capacitance values and a threshold and to provide a comparison therebetween to determine a depth of the feature relative to the surface,
further comprising an indicator coupled to the second comparison circuit thereby to provide an indication of the depth of the feature behind the surface.

12. The sensor of claim 11, further comprising an indicator coupled to the first comparison circuit thereby to provide an indication of the ratio of the capacitances.

13. The sensor of claim 12, wherein the indication is that the ratio is approximately equal to a predetermined ratio, thereby locating an edge of an object behind the surface.

14. The sensor of claim 12, wherein the indication is that the ratio is approximately equal to one, thereby locating a centerline of an object behind the surface.

* * * * *